United States Patent
Kuroda et al.

(10) Patent No.: US 6,549,496 B2
(45) Date of Patent: Apr. 15, 2003

(54) INFORMATION RECORDING APPARATUS AND INFORMATION REPRODUCING APPARATUS

(75) Inventors: Kazuo Kuroda, Tokorozawa (JP); Toshiro Tanikawa, Tokorozawa (JP); Hidehiro Ishii, Tokorozawa (JP); Jiro Endo, Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 49 days.

(21) Appl. No.: 09/829,904

(22) Filed: Apr. 11, 2001

(65) Prior Publication Data

US 2001/0015943 A1 Aug. 23, 2001

Related U.S. Application Data

(63) Continuation of application No. 09/263,851, filed on Mar. 8, 1999, now Pat. No. 6,219,309.

(30) Foreign Application Priority Data

Mar. 9, 1998 (JP) .......................................... P10-76609

(51) Int. Cl.⁷ ................................................. G11B 5/09
(52) U.S. Cl. ................................. 369/47.27; 369/30.09
(58) Field of Search .......................... 369/47.11, 47.16, 369/47.39, 47.27, 32, 67.22, 30.07, 30.08, 30.25, 53.24, 30.23, 47.33, 272, 275.2, 275.1, 30.09, 124.09

(56) References Cited

U.S. PATENT DOCUMENTS

| | | | |
|---|---|---|---|
| 5,200,943 A | 4/1993 | Sano et al. | 369/47.22 |
| 5,317,549 A | 5/1994 | Maeda et al. | 369/53.24 |
| 5,351,226 A | 9/1994 | Mizumoto et al. | 369/47.39 |
| 5,436,875 A | 7/1995 | Shinada | 369/32 |
| 5,493,558 A * | 2/1996 | Kihara | 369/275.2 |
| 5,519,680 A | 5/1996 | Honda | 369/47.11 |
| 5,543,861 A | 8/1996 | Harradine et al. | 348/718 |
| 5,590,100 A * | 12/1996 | Ogusu et al. | 369/30.02 |
| 5,828,631 A | 10/1998 | Shimabukuro | 369/30.07 |
| 5,859,821 A | 1/1999 | Koya et al. | 369/30.25 |
| 5,862,104 A | 1/1999 | Matsumoto | 369/7 |
| 5,970,028 A | 10/1999 | Shimabukuro | 369/30.08 |
| 6,088,506 A | 7/2000 | Yoshio et al. | 386/46 |
| 6,189,014 B1 * | 2/2001 | Nakashima et al. | 369/272 |

FOREIGN PATENT DOCUMENTS

| | | |
|---|---|---|
| EP | 0 544 299 A2 | 6/1993 |
| JP | 09-251712 | 9/1997 |

* cited by examiner

*Primary Examiner*—Paul W. Huber
*Assistant Examiner*—Kim-Kwok Chu
(74) *Attorney, Agent, or Firm*—Morgan, Lewis & Bockius LLP

(57) ABSTRACT

An apparatus records main information and sub information onto an information recording medium, which has a main recording area and a sub recording area. The apparatus is provided with an receiving device that receives the main information input from the external source; an accumulating device that accumulates the main information received by the receiving device; a recording device that records the main information and the sub information to the main recording area and the sub recording area, respectively; and a controller that determines whether or not an amount of the main information accumulated in the accumulating device is smaller than a predetermined amount, and that controls the recording device. In the apparatus, the recording device records the sub information to the sub recording area under a control of the controller if the controller determines that the amount of the main information accumulated in the accumulating device is smaller than the predetermined amount, and the recording device records the main information to the main recording area under a control of the controller if the controller determines that the amount of the main information accumulated in the accumulating device is not smaller than the predetermined amount.

10 Claims, 8 Drawing Sheets

INFORMATION RECORDING APPARATUS AND INFORMATION REPRODUCING APPARATUS

This is a Continuation of allowed U.S. application Ser. No. 09/263,851, filed on Mar. 8, 1999 now U.S. Pat. No. 6,219,309.

BACKGROUND OF THE INVENTION

1. Field of the Invention

The present invention relates to an information recording apparatus for recording an information signal on an information record medium of a recordable type such as a phase change type optical disk, and an information reproducing apparatus for reproducing the information signal from the information record medium.

2. Description of the Related Art

Typically, an optical disk of a read only type has a main record area and sub record areas. A main information signal indicative of main information, such as video information or music information, is recorded on the main record area. The sub record areas are respectively disposed on an inner circumference side and an outer circumference side so as to sandwich the main record area between them. Usually, the sub record area located on the inner circumference side of the main record area is referred to as a lead-in area, and the sub record area located on the outer circumference side of the main record area is referred to as a lead-out area. For example, as shown in FIG. 1, in a case of a DVD (Digital Versatile Disk) 200, an area between a diameter of 48 mm and a diameter of 116 mm is a main record area 201, an area between a diameter of 46 mm and a diameter of 48 mm is a lead-in area 202, and an area between a diameter of 116 mm and a diameter of 117 mm is a lead-out area 203.

The lead-in area 202 and the lead-out area 203 are formed in order to optimally read in the main information signal recorded between the innermost circumference track and the outermost circumference track of the main record area 201.

If it is temporarily assumed that the lead-in area and the leadout area are not present in the read only type optical disk, there may be a possibility of an occurrence of an event described below. When the main information signal recorded on the innermost circumference track or the outermost circumference track is read in, the movement of a pickup is limited in such a way that the pickup moves towards the innermost circumference track or the outermost circumference track. At this time, if a disturbance occurs, the movement of the pickup may be not correctly controlled. Thus, the pickup may pass the innermost circumference track and move further to the inner circumference side or pass the outermost circumference track and move further to the outer circumference side. Information tracks (pits) are not formed outside the main record area. Hence, if the pickup goes outside of the main record area, it is impossible to obtain the information necessary for the movement control of the pickup (for example, the information to generate a tracking error signal). As a result, the movement control of the pickup can not be done in the worst case.

In order to solve such a problem, the lead-in area 202 is formed further to the inner circumference side of the innermost circumference track in the main record area 201, and the lead-out area 203 is formed further to the outer circumference side of the outermost circumference track in the main record area 201. And, the information tracks (pits) are formed on the lead-in area 202 and the lead-out area 203. Special signals indicative of the lead-in area or the lead-out area are recorded on these information tracks as sub information signals.

Moreover, content information with regard to the main information signal recorded on the main record area, attribute information of the disk and the like are recorded together with the special signals as the sub information signals, depending on the kind of the optical disk.

As for an optical disk of a recordable type, which is referred to as a "recordable optical disk", a record track, a guide track and pre-pits are formed on its recording surface. The guide track is a track for guiding a record light beam to the record track (for example, a groove track), and is referred to as a land track, for example. The pre-pits are pits for recording pre-information to specify positions (addresses) on the disk. When recording information on the recordable optical disk, a recording apparatus can specify the record position of the information by detecting the guide track and the pre-pits and can correctly control the movement of the pickup and the radiation of the light beam.

The recordable optical disk also has areas corresponding to the lead-in area and the lead-out area of the read only type optical disk. The guide track and the pre-pits are also formed in these areas. When recording the information on the recordable optical disk, the recording apparatus records the above-mentioned special signals (if necessary, the content information and the attribute information) on these areas corresponding to the lead-in area and the lead-out area. Accordingly, the recordable optical disk after the information is recorded thereon and the read only type optical disk are unified in format. Therefore, the information recorded on the recordable optical disk can be reproduced by a reproducing apparatus for reproducing the read only type optical disk.

The area in which the information tracks (pit rows) are formed, namely, the main record area can be recognized by the reproducing apparatus by detecting the special signals recorded on the recordable optical disk. In a case of a reproducing apparatus which employs a manner of generating a tracking error signal based on a phase difference of a light beam reflected by the pit rows, it is necessary that the main record area can be exactly recognized in order to surely carry out the movement control of the pickup. Hence, from the viewpoint of such an aspect, it is important to record the special signals.

In the conventional recording apparatus, when the information is recorded on the recordable optical disk, the main information signal is firstly recorded on the recordable optical disk. After all the main information signals to be recorded are recorded, the special signals (if necessary, the content information and the attribute information) are recorded on the lead-in area and the lead-out area. As a result, in order to record the information on the recordable optical disk, the conventional recording apparatus needs not only the recording process of recording the main record information but also the recording process of recording the special signals. This results in a problem that it takes a long time to carry out the recording process.

SUMMARY OF THE INVENTION

It is therefore an object of the present invention to provide an information recording apparatus and an information reproducing apparatus, which can shorten a time required to record information on an optical disk.

The above-mentioned object can be achieved by an information recording apparatus in accordance with the present invention. The information recording apparatus is an apparatus for recording main information and sub information onto an information recording medium, which has a main recording area and a sub recording area. The main information is input from an external source.

The information recording apparatus includes: an receiving device that receives the main information input from the external source; an accumulating device that accumulates the main information received by the receiving device; a recording device that records the main information and the sub information to the main recording area and the sub recording area, respectively; and a first controller that determines whether or not an amount of the main information accumulated in the accumulating device is smaller than a predetermined amount, and that controls the recording device.

In this apparatus, the recording device records the sub information to the sub recording area under a control of the first controller if the first controller determines that the amount of the main information accumulated in the accumulating device is smaller than the predetermined amount, and the recording device records the main information to the main recording area under a control of the first controller if the first controller determines that the amount of the main information accumulated in the accumulating device is not smaller than the predetermined amount.

When the operation of the information recording apparatus is started, the main information is input from the external source. This main information is received by the receiving device and accumulated in the accumulating device. At this time, the first controller determines whether or not the amount of the main information accumulated in the accumulating device is smaller than the predetermined amount. When the input of the main information has been just started, the amount of the main information accumulated in the accumulating device is smaller than a predetermined amount, so that the recording device records the sub information to the sub recording area under the control of the first controller. After that, the amount of the main information in the accumulating device increases and reaches the predetermined amount. At this time, the recording device stops recording the sub information, and then starts to record the main information to the main recording area under the control of the first controller. If the recording of the main information is started, the amount of the main information in the accumulating device decreases. As a result, the amount of the main information in the accumulating device becomes smaller than the predetermined amount. If the amount of the main information in the accumulating device becomes smaller than the predetermined amount, the recording device stops recording the main information, and then starts to record the sub information to the sub recording area. Such an operation is repeatedly performed. Thus, both the main information and the sub information are simultaneously recorded to the main recording area and the sub recording area, respectively.

Hence, the sub information can be effectively recorded, and it is possible to shorten the entire time necessary for the recording process.

Furthermore, in the apparatus, the receiving device receives the main information from the external source at a predetermined input rate, and the recording device records each of the main information and the sub information at a predetermined recording rate. In this case, it is preferable that the predetermined recording rate is faster than the predetermined input rate. Therefore, the time period corresponding to the difference between the recording rate and the input rate can be used for recording the sub information.

The information recording apparatus may further include: an initializing device that initializes the apparatus; an instruction receiving device that receives an instruction to record the main information to the information recording medium; and a second controller that determines whether or not the instruction receiving device receives the instruction, and that controls the recording device. In the apparatus having these additional devices, the recording device records the sub information to the sub recording area under a control of the second controller during a time period after the initializing device initializes the apparatus and before the second controller determines that the instruction receiving device receives the instruction. According to this type of the information recording apparatus, the sub information can be recorded before the recording of the main information is actually started in response to the user's instruction. Therefore, the sub information can be effectively recorded, and it is possible to further shorten the entire time necessary for the recording process.

The information recording apparatus may further include a third controller that determines whether or not a recording of the main information to be recorded is finished, and that controls the recording device. In the apparatus having such an additional device, the recording device records the sub information to the sub recording area under a control of the third controller after the third controller determines that the recording of the main information to be recorded is finished. According to this type of the information recording apparatus, the sub information can be recorded to the sub recording area, if an area that the sub information should be recorded remains in the sub recording area at the stage where the recording of the main information has been finished. Therefore, the sub information can be effectively recorded.

The above-mentioned object can be achieved by an information reproducing apparatus in accordance with the present invention. The information reproducing apparatus is an apparatus for reproducing main information recorded on a main recording area of an information recording medium which has the main recording area and a sub recording area, and for recording sub information to the sub recording area. The information reproducing apparatus includes: a reading/recording device that reads out the main information recorded on the main recording area, and that records the sub information to the sub recording area; an accumulating device that accumulates the main information read out from the main recording area by the reading/recording device; an output device that outputs the main information accumulated in the accumulating device; and a first controller that determines whether or not an amount of the main information accumulated in the accumulating device is smaller than a predetermined amount. In this apparatus. the reading/recording device reads the main information recorded in the main recording area under a control of the first controller if the first controller determines that the amount of the main information accumulated in the accumulating device is smaller than the predetermined amount, and the reading/recording device records the sub information to the sub recording area under a control of the first controller if the first controller determines that the amount of the main information accumulated in the accumulating device is not smaller than the predetermined amount.

According to this information reproducing apparatus, the recording of the sub information and the reproduction of the main information are alternatively carried out, depending on the amount of the main information accumulated in the accumulating device. This means that the recording of sub information and the reproduction of the main information are substantially carried out at the same time. Hence, the sub information can be effectively recorded.

The information reproducing apparatus may further include: an initializing device that initializes the apparatus; an instruction receiving device that receives an instruction to read out the main information from the information recording medium; and a second controller that determines whether or not the instruction receiving device receives the instruction, and that controls the reading/recording device. In the apparatus having these additional devices, the reading/recording device records the sub information to the sub recording area under a control of the second controller during a time period after the initializing device initializes the apparatus and before the second controller determines that the instruction receiving device receives the instruction. According to this type of the information reproducing apparatus, the sub information can be recorded before the reading (reproducing) of the main information is actually started in response to the user's instruction. Therefore, the sub information can be effectively recorded, and it is possible to further shorten the entire time necessary for the recording process.

The information reproducing apparatus may further include a third controller that determines whether or not a reading of the main information to be read out is finished, and that controls the reading/recording device. In the apparatus having this additional device, the reading/recording device records the sub information to the sub recording area under a control of the third controller after the third controller determines that the reading of the main information to be read out is finished. According to this type of the information reproducing apparatus, the sub information can be recorded to the sub recording area, if an area that the sub information should be recorded remains in the sub recording area at the stage where the reading (reproducing) of the main information has been finished. Therefore, the sub information can be effectively recorded.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

An embodiment of the present invention will be described below. In the embodiment described below, the case is described in which the present invention is applied to an information recording apparatus for recording information on an optical disk that is a recording medium in a form of a disk where the information can be optically recorded and reproduced. In addition, the information recording apparatus according to this embodiment also has a function of reproducing the optical disk.

Figure 1:
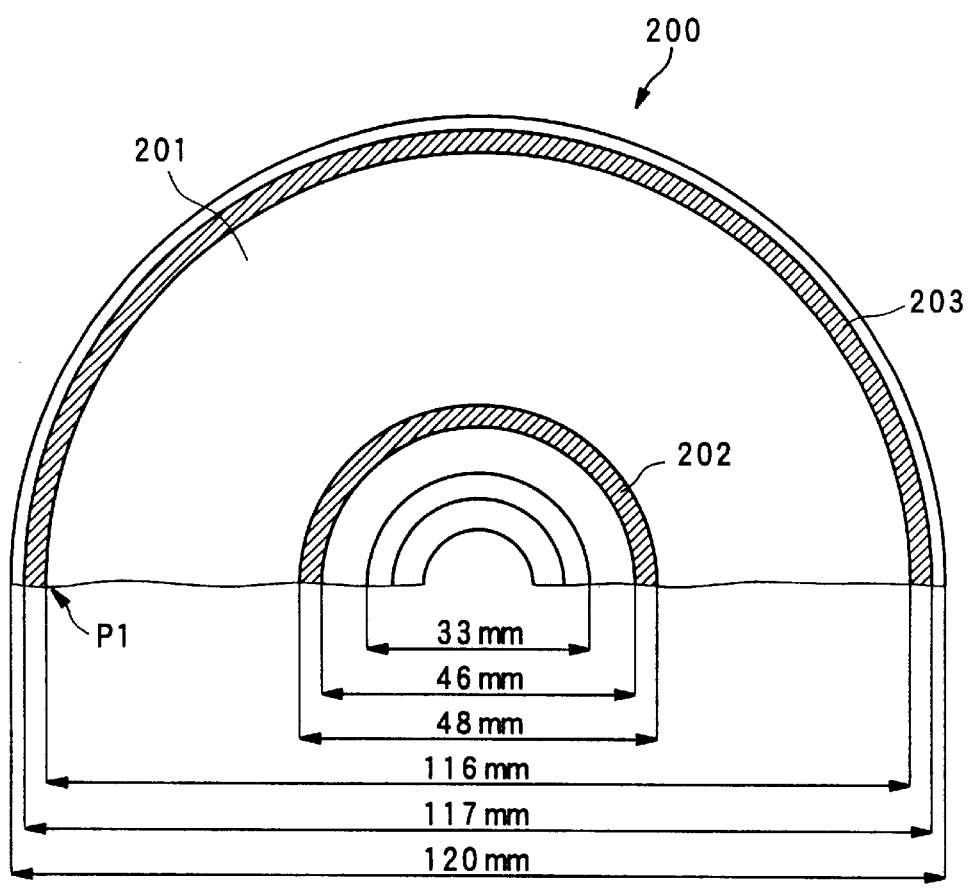
FIG. 1 is a recording surface of an optical disk.
Figure 2:
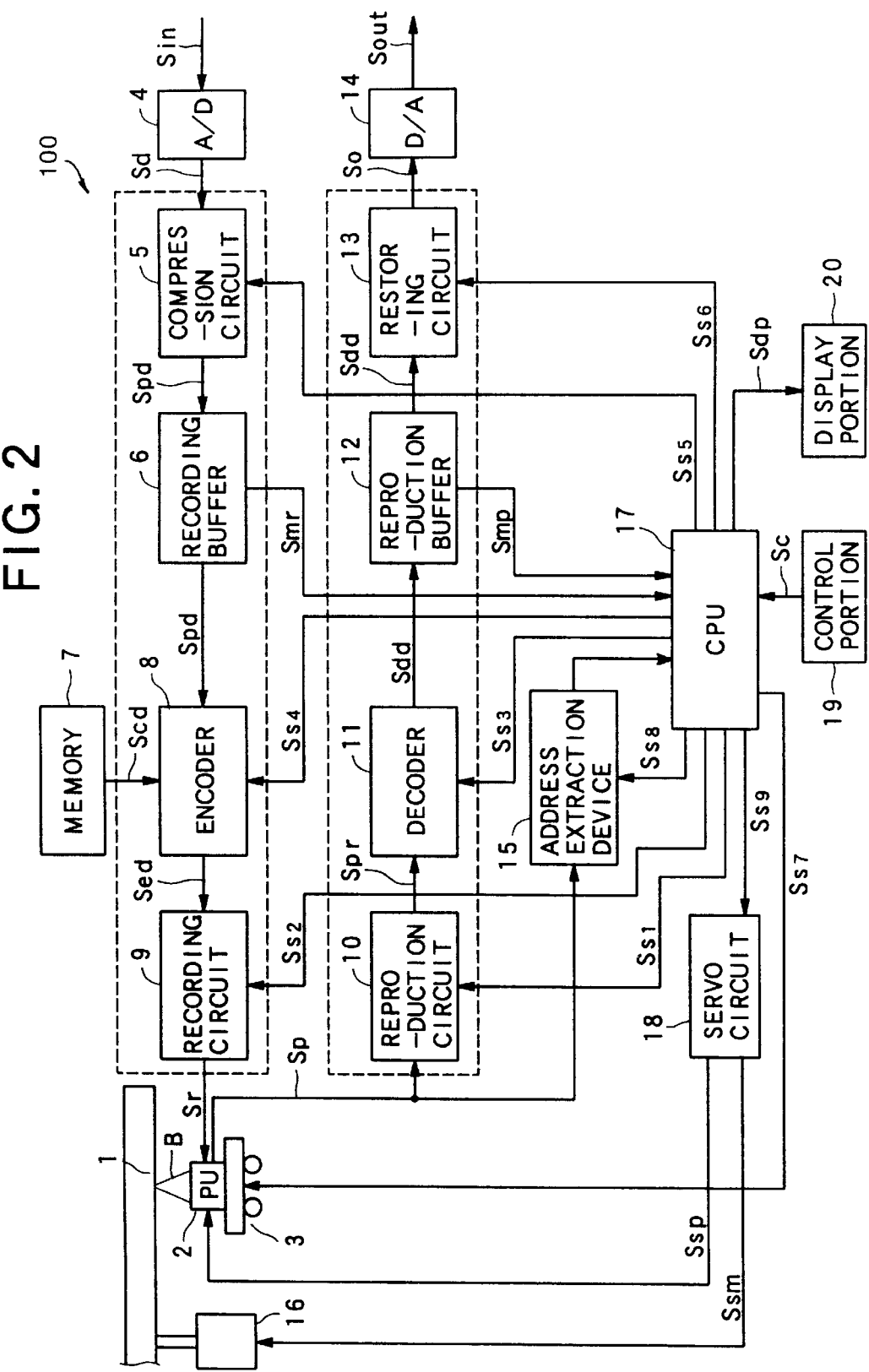
FIG. 2 is a block diagram showing an information recording apparatus according to an embodiment in the present invention.

FIG. 2 shows a configuration of an information recording apparatus 100 according to the embodiment in the present invention. As shown in FIG. 2, the information recording apparatus 100 is provided with a pickup 2, a slider 3, an analog-digital (A/D) converter 4, a compression circuit 5, a recording buffer 6, an encoder 8, a recording circuit 9, a memory 7, a reproduction circuit 10, a decoder 11, a reproduction buffer 12, a restoring circuit 13, a digital-analog (D/A) converter 14, an address extraction device 15, a spindle motor 16, a CPU 17, a servo circuit 18, a control portion 19 and a display portion 20.

When the information is recorded on an optical disk 1, the information recording apparatus 100 is operated as follows.

When an information signal Sin is input to the information recording apparatus 100 at a predetermined input rate Mr, the information signal Sin is firstly sent to the A/D converter 4. The information signal Sin is an analog signal indicative of image information, audio information or a combination of both the image information and the audio information.

The A/D converter 4 digitizes the information signal Sin and then generates a digital information signal Sd. This digital information signal Sd is sent to the compression circuit 5.

The compression circuit 5 compresses the digital information signal Sd and then generates a compression information signal Spd. The compression circuit 5 carries out the compression process in accordance with a control signal Ss5 output by the CPU 17. For example, a compression technique according to an MPEG 2 (Moving Picture coding Experts Group 2) is used for this compression process. The compression information signal Spd is sent to the recording buffer 6.

The recording buffer 6 transiently accumulates the compression information signal Spd. The recording buffer 6 always outputs to the CPU 17 a data amount signal Smr indicative of the data amount of the compression information signal Spd accumulated in the recording buffer 6.

A sub information signal Scd including the special signals is stored in advance in the memory 7. The encoder 8 reads out the compression information signal Spd accumulated in the recording buffer 6 or the sub information signal Scd stored in the memory 7 at a recording rate Rr, and then encodes it, and further generates an encoding signal Sed. The encoder 8 carries out the encoding process in accordance with a control signal Ss4 output by the CPU 17. The encoding signal Sed is sent to the recording circuit 9.

The recording rate Rr is set to be equal to or higher than the input rate Mr of the information signal Sin. As a result, the compression information signal Spd accumulated in the recording buffer 6 is read out at the recording rate Rr equal to or higher than the input rate Mr. A rate at which the sub information signal Scd is output from the memory 7 to the encoder 8 is also equal to the recording rate Rr. In addition, the recording rate Rr can be determined, for example, in accordance with the processing speed of the encoder 8, the processing speed of the recording circuit 9 and the operation speed of the pickup 2. These processing speeds and the operation speed can be controlled by the CPU 17.

The recording circuit 9 converts the encoding signal Sed into a record signal Sr, and then outputs it to the pickup 2. This converting process is, for example, a write strategy processing, and is a process required to improve the accuracy of the shape of the pit formed in the optical disk 1. The converting process in the recording circuit 9 is carried out in accordance with a control signal Ss2 output by the CPU 17.

The pickup 2 is moved in a radius direction of the optical disk 1 through the slider 3. The movement of the pickup 2 is controlled in accordance with a control signal Ss7 output by the CPU 17.

The pickup 2 has a light source composed of, for example, a semiconductor laser. The pickup 2 drives the light source, and then generates a light beam B (the light beam B for the recording operation) corresponding to the record signal Sr output by the recording circuit 9, and further radiates this light beam B to the recording surface (containing a main record area, a lead-in area and a lead-out area) of the optical disk. As a result, the pits corresponding to the record signal Sr are formed on the recording surface of the optical disk 1 by the phase change manner.

While the pickup 2 records the record signal Sr, the optical disk 1 is being rotated by the spindle motor 16 at a predetermined rotation speed. In addition, the spindle motor 16 is driven in accordance with a spindle control signal Ssm.

In this way, the information signal Sin and the sub information signal Scd are recorded as the pits on the optical disk 1 at the recording rate Rr.

The information recording apparatus 100 can also reproduce the information recorded on the optical disk 1. When the information recorded on the optical disk 1 is reproduced, the information recording apparatus 100 is operated as follows.

The pickup 2 is moved on the optical disk 1 through the slider 3, and radiates the light beam B for the reproduction to the rotating optical disk 1. Then, the pickup 2 detects the light beam B reflected by the pit of the optical disk 1, and generates a detection signal Sp corresponding to the pit at a detection rate Rp or reading rate. This detection signal Sp is output to the reproduction circuit 10 and the address extraction device 15.

The reproduction circuit 10 amplifies the detection signal Sp at a predetermined amplification factor, and then reshapes the wave form of the detection signal Sp. The reproduction circuit 10 is operated in accordance with a control signal Ss1 output by the CPU 17. Then, the detection signal Sp is sent as a reproduction signal Spr from the reproduction circuit 10 to the decoder 11.

The decoder 11 decodes the reproduction signal Spr in accordance with a decoding manner corresponding to the encoding manner of the encoder 8, and then generates a decoding signal Sdd. The decoder 11 carries out the decoding process in accordance with a control signal Ss3 output by the CPU 17. Then, the decoder 11 outputs the decoding signal Sdd to the reproduction buffer 12 at a speed corresponding to the detection rate Rp.

The reproduction buffer 12 transiently accumulates the decoding signal Sdd. The reproduction buffer 12 always outputs to the CPU 17 a data amount signal Smp indicative of the data amount of the decoding signal Sdd accumulated in the reproduction buffer 12.

The restoring circuit 13 reads out the decoding signal Sdd accumulated in the reproduction buffer 12 at an output rate Mp, and then performs an expanding process (a reverse compression process) on the read out decoding signal Sdd, and further generates an expansion signal So. This expanding process corresponds to the compression process of the compression circuit 5. The restoring circuit 13 carries out the expanding process in accordance with a control signal Ss6 output by the CPU 17. The expansion signal So is sent to the D/A converter 14.

The output rate Mp is equal to or lower than the detection rate Rp. As a result, the decoding signal Sdd accumulated in the reproduction buffer 12 is read out at the recording rate Mp equal to or lower than the detection rate Rp. In addition, the output rate Mp can be determined, for example, in accordance with the processing speed of the restoring circuit 13 and the processing speed of the D/A converter 14. These processing speeds can be controlled by the CPU 17.

Then, the D/A converter 14 converts the expansion signal So into analog signal, and then outputs it as an output signal Sout.

Meanwhile, the address extraction device 15 decodes the detection signal Sp output by the pickup 2, and detects pre-information. Then, the address extraction device 15 generates an address information signal Sda indicative of an address (a reproduction position) on the optical disk 1 based on the pre-information, and outputs the address information signal Sda to the CPU 17. The address extraction device 15 is operated in accordance with a control signal Ss8 output by the CPU 17.

The CPU 17 controls the information recording apparatus 100 in order to execute the above-mentioned recording process and reproducing process. Actually, the CPU 17 generates the control signals Ss1 to Ss8, in accordance with the data amount signal Smr output by the recording buffer 6 or the data amount signal Smp output by the reproduction buffer 12, and accordingly controls the operations of the compression circuit 5, the encoder 8, the recording circuit 9, the reproduction circuit 10, the decoder 11, the restoring circuit 13 and the like. FIGS. 3, 4A, 4B, 6A and 6B are flowcharts of further actually showing the recording process and the reproducing process executed by the CPU 17.

An control portion 19 is an input device for outputting to the CPU 17 an indication input by a user as an indication signal Sc.

In addition, in the recording process and the reproducing process, the CPU 17 generates a control signal Ss9 to serve-control the spindle motor 16 and the pickup 2, and then outputs it to the servo circuit 18. The servo circuit 18 generates a spindle control signal Ssm to control the rotation of the spindle motor 16 in accordance with the control signal Ss9, and outputs the spindle control signal Ssm to the spindle motor 16. Moreover, the servo circuit 18 generates a pickup control signal Ssp for the sake of a tracking servo control and a focus servo control of the pickup 2, and outputs it to the pickup 2. The pickup 2 carries out the tracking servo control and the focus servo control in accordance with the pickup control signal Ssp, and accordingly controls a radiation position and a focal point of the light beam B.

Moreover, the information by which the user checks the operations of the information recording apparatus 100 and the information by which the user inputs the indication to the information recording apparatus 100 are displayed on the display portion 20 based on a display signal Sdp output by the CPU 17.

Figure 3:
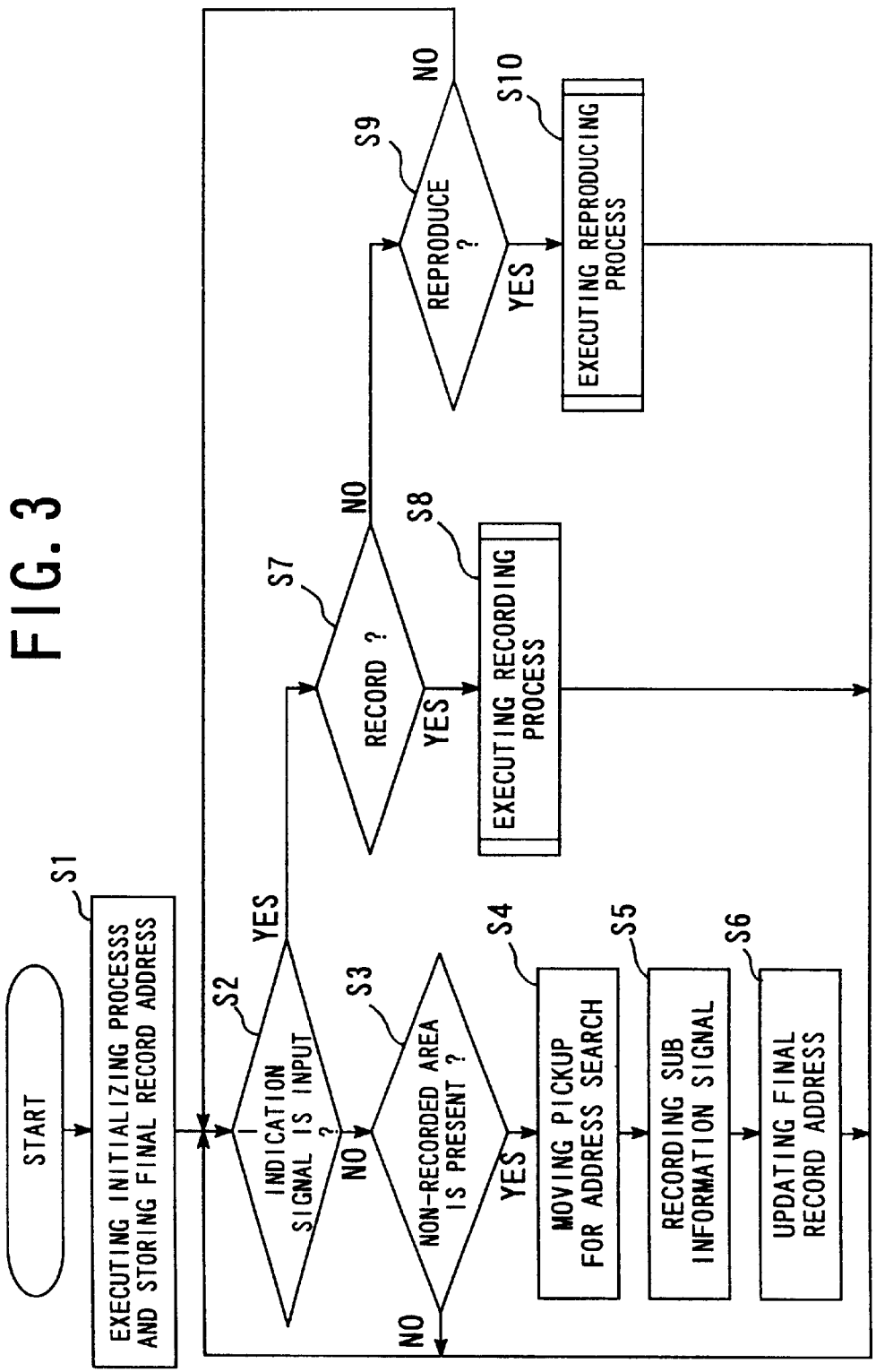
FIG. 3 is a flowchart showing processes according to the embodiment in the present invention.

The recording process and the reproducing process of the information recording apparatus 100 will be described in detail with reference to FIG. 3.

When the optical disk 1 is placed on a turn table (not shown) mounted in the information recording apparatus 100, the CPU 17 executes an initialize process. In this initialize process, the CPU 17 instructs the pickup 2 to move to the vicinity of the start position of the lead-in area on the optical disk 1. Then, the CPU 17 controls the pickup 2 so as to radiate the light beam B for the reproduction. Then, the CPU 17 determines whether or not an RF signal component corresponding to the sub information signal is included in the light beam reflected by the optical disk 1. If information is already recorded on the optical disk 1, such an RF signal component is included in the light beam. In this case, the CPU 17 reads in the sub information signals respectively recorded on the lead-in area and the lead-out area, and accordingly detects the record positions at the end portions of the sub information signals recorded on the respective areas. Then, the CPU 17 stores the detected record positions in an internal RAM (not shown) of the CPU 17 as final record addresses F1, F2. On one hand, if the optical disk 1 is a non-recorded recordable disk, the RF signal is not included in the light beam. In this case, the CPU 17 stores the start addresses of the lead-in area and the lead-out area in the internal RAM as the final record addresses F1, F2, respectively (Step 1).

Next, the CPU 17 determines whether or not an indication of specifying any one of the recording process and the reproducing process is input to the information recording apparatus 100 by the user who uses the control portion 19. Actually, the CPU 17 determines whether or not an indication signal Sc of specifying any one of the recording process and the reproducing process is input (Step 2).

If the indication signal Sc is not input, the CPU 17 compares the final record addresses F1, F2 stored in the internal RAM with final addresses E1, E2 in the lead-in area and the lead-out area, respectively (Step 3). In addition, if the lead-in area and the lead-out area are predefined fixed areas, the final addresses E1, E2 in the lead-in area and the lead-out area are defined in advance.

If the non-recorded area is present in the lead-in area, the final record address F1 is smaller than the final address E1 in the lead-in area. In this case, the CPU 17 instructs the pickup 2 to move to the next address after the final record address F1. On the other hand, if the non-recorded area is present in the lead-out area, the final record address F2 is smaller than the final address E2 in the lead-out area. In this case, the CPU 17 instructs the pickup 2 to move to the next address after the final record address F2 (Step 4).

Next, the CPU 17 controls the encoder 8, the recording circuit 9 and the pickup 2 so as to record on the optical disk 1 the sub information signal Scd stored in the memory 7 (Step 5). Accordingly, the sub information signal Scd is recorded by an amount corresponding to one unit block from the next address after the final record address F1 or F2. The data amount of the sub information signal Scd included in the one unit block is equal to, for example, the data amount corresponding to one ECC (Error Collecting Code) block.

The record position of the end portion of the sub information signal recorded on the optical disk 1, namely, the final record address F1 or F2 is changed as the result that the sub information signal Scd is recorded on the optical disk 1 at the step 5. Thus, the CPU 17 updates the final record address F1 or F2 stored in the internal RAM (Step 6).

On the other hand, if the non-recorded area of the sub information signal is not present in the lead-in area or the lead-out area at the step 3, the final record addresses F1, F2 correspond to the final addresses E1, E2, respectively. In this case, the process returns back to the step 2. In addition, the fact that the non-recorded area is not present in the lead-in area or the lead-out area implies that the sub information signal is perfectly recorded on the whole lead-in area and the whole lead-out area, respectively.

As can be understood from the above, the information recording apparatus 100 records the sub information signal Scd on the lead-in area and the lead-out area in the period while the indication signal, Sc is not sent to the information recording apparatus 100. That is, the information recording apparatus 100 records the sub information signal Scd on the optical disk 1 by using a period except that when the recording process and the reproducing process of the main information signal are executed. The sub information signal can be effectively recorded since the above-mentioned empty time is used to record the sub information signal Scd.

In addition, the final record addresses F1, F2 stored in the internal RAM of the CPU 17 are erased (initialized) when the optical disk 1 is removed from the information recording apparatus 100.

If the indication signal Sc indicative of the recording process is input at the step 2, the CPU 17 executes the recording process in accordance with the determination at the step 7 (Step 8). On the other hand, if the indication signal Sc indicative of the reproducing process is input at the step 2, the CPU 17 executes the reproducing process in accordance with the determinations at the steps 7 and 9 (Step 10). In addition, if an abnormal indication signal Sc is input, the CPU 17 outputs an error display to the display portion 20. After that, the process returns back to the step 2.

The recording process of the information recording apparatus 100 will be described in more detail with reference to FIGS. 4A and 4B.

Figure 4A:
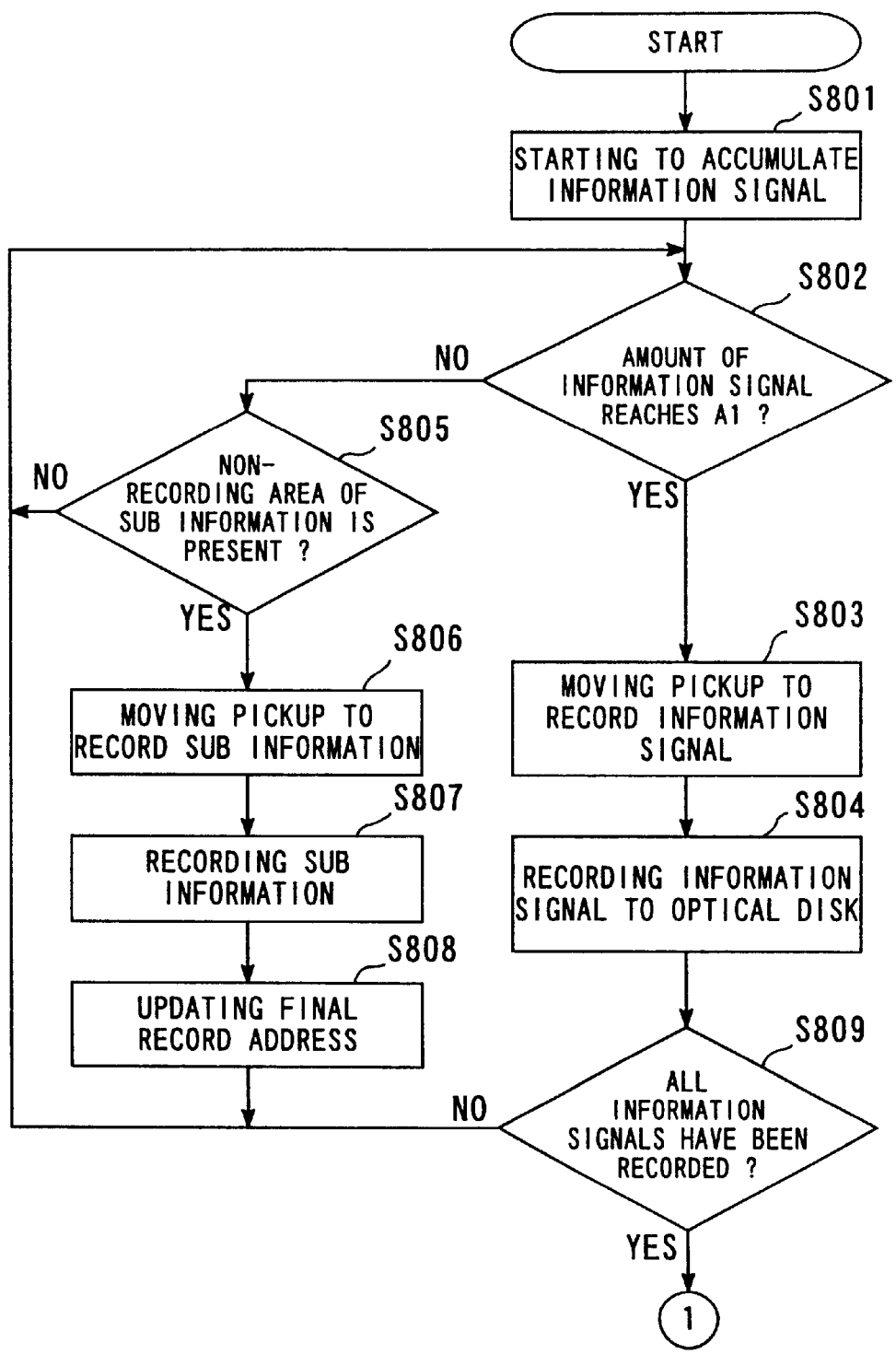
FIG. 4A is a flowchart showing a recording process according to the embodiment in the present invention.
Figure 4B:
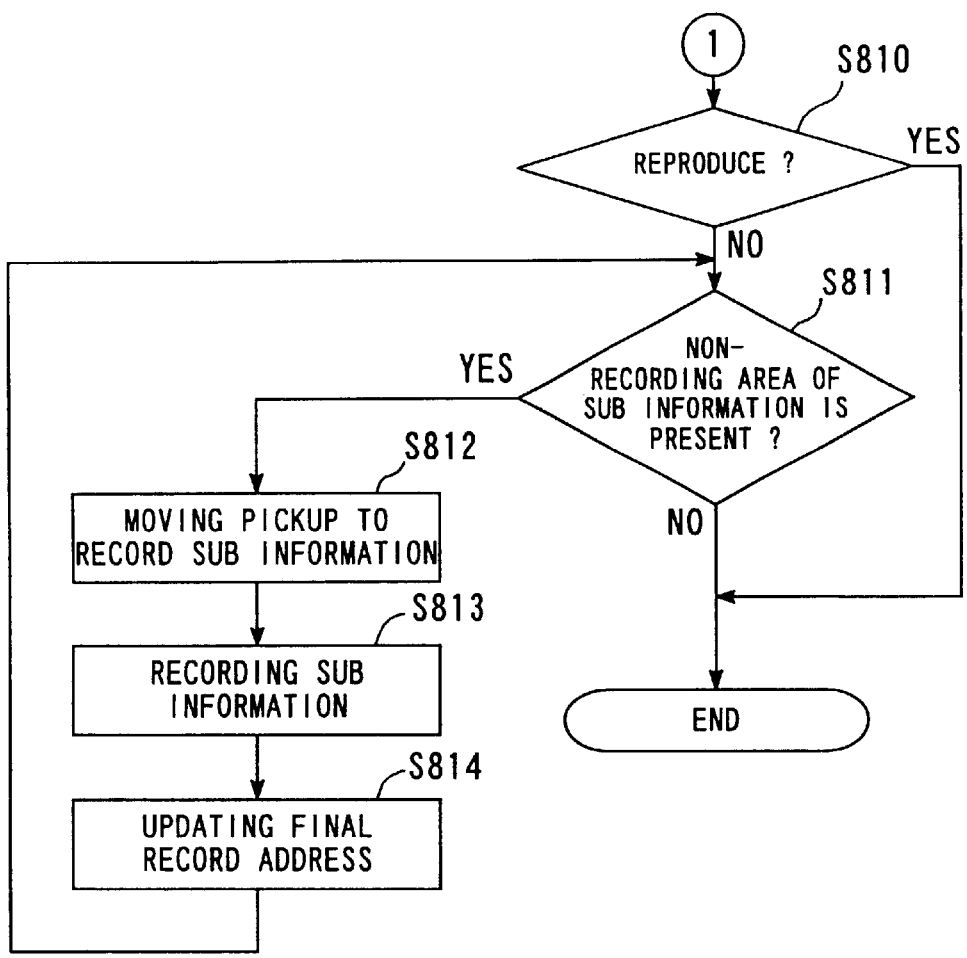
FIG. 4B is a flowchart showing a recording process according to the embodiment in the present invention.

If the indication signal Sc indicative of the recording process is input to the information recording apparatus 100, the CPU 17 executes the recording process shown in FIGS. 4A and 4B. As shown in FIG. 4A, at first, the CPU 17 controls the A/D converter 4 and the compression circuit 5 in order to start the reception of the information signal Sin. Accordingly, the compression information signal Spd corresponding to the information signal Sin is accumulated in the recording buffer 6 at the input rate Mr (Step 801).

Next, the CPU 17 determines in accordance with the data amount signal Smr whether or not the data amount of the compression information signal Spd accumulated in the recording buffer 6 is equal to or larger than a first determined amount A1 (Step 802). In addition, the first determined amount A1 is defined in advance. If the data amount of the compression information signal Spd accumulated in the recording buffer 6 is equal to or larger than the first determined amount A1, the CPU 17 instructs the pickup 2 to move to the record position in order to start the recording operation of the record signal Sr corresponding to the compression information signal Spd (Step 803).

Next, the CPU 17 instructs the encoder 8 to read out the compression information signal Spd accumulated in the recording buffer 6 by a second predetermined amount A2. Then, the CPU 17 instructs the pickup 2 to record the record signal Sr corresponding to the compression information signal Spd on the optical disk 1 (Step 804). Accordingly, the record signal Sr is recorded on the main record area of the optical disk 1 at the recording rate Rr.

On the other hand, if the data amount of the compression information signal Spd accumulated in the recording buffer 6 does not reach the first predetermined amount A1 at the step 802, the CPU 17 suspends the recording operation of the record signal Sr corresponding to the information signal Sin. Then, the CPU 17 compares the final record addresses F1, F2 stored in the internal RAM with the final addresses E1, E2 in the lead-in area and the lead-out area, respectively (Step 805).

If the non-recorded area of the sub information signal is not present in the lead-in area or the lead-out area, the final record addresses F1, F2 agree with the final address E1, E2, respectively. In this case, the process returns back to the step 802. Then, the CPU 17 continues to suspend the recording operation until the compression information signal Spd accumulated in the recording buffer 6 reaches the first determined amount A1.

On the other hand, if the non-recorded area is present in the lead-in area at the step 805, the final record address F1 is smaller than the final address E1 in the lead-in area. In this case, the CPU 17 instructs the pickup 2 to move to the next address after the final record address F1. On the other hand, if the non-recorded area is present in the lead-out area, the final record address F2 is smaller than the final address E2 in the lead-out area. In this case, the CPU 17 instructs the pickup 2 to move to the next address after the final record address F2 (Step 806).

Next, the CPU 17 controls the encoder 8, the recording circuit 9 and the pickup 2 so as to record on the optical disk 1 the sub information signal Scd stored in the memory 7 (Step 807). Accordingly, the sub information signal Scd is recorded by an amount corresponding to one unit block from the next address after the final record address F1 or F2. The data amount of the sub information signal Scd included in the one unit block is equal to, for example, the data amount corresponding to one ECC (Error Collecting Code) block.

The record position of the end portion of the sub information signal recorded on the optical disk 1, namely, the final record address F1 or F2 is changed as the result that the sub information signal Scd is recorded on the optical disk 1 at the step 807. Thus, the CPU 17 updates the final record address F1 or F2 stored in the internal RAM (Step 808).

The sub information signal Scd is recorded on the lead-in area and the lead-out area in the processes at the steps 806 to 808. That is, the lead-in area and the lead-out area are formed until the compression information signal Spd accumulated in the recording buffer 6 reaches the first determined amount A1. In this way, the sub information signal Scd can be recorded by using the period while the process of recording the record signal Sr corresponding to the information signal Sin on the main record area of the optical disk 1 is suspended by the difference between the input rate Mr and the recording rate Rr. Thus, the sub information signal Scd can be effectively recorded.

In addition, the first determined amount A1 is determined by considering the necessary time until the recording operation of the record signal Sr on the optical disk 1 is started after the determination at the step 802, the input rate Mr, a capacity Br of the recording buffer 6 and the like, so that the recording buffer 6 is not filled with the compression information signal Scd in the period until the recording operation of the record signal Sr on the optical disk 1 is started after the determination at the step 802. Moreover, the second determined amount A2 may be equal to the first determined amount A1. Furthermore, in order to exhaust all the compression information signals Spd accumulated in the recording buffer 6, the second determined amount A2 may be larger than the first determined amount A1. In order to attain this, it is necessary to consider the amount of the compression information signal Spd to be newly accumulated in the recording buffer 6 during searching the record position and during recording the record signal Sr.

After the execution at the step 804, the CPU 17 determines whether or not all the information signals Sin to be recorded are recorded (Step 809). If all the information signals Sin are not recorded, the CPU 17 repeats the processes at the steps 802 to 809.

On one hand, if all the information signals Sin are recorded, the CPU 17 determines whether or not the indication of specifying the reproducing process is input from the control portion 19, as shown in FIG. 4B (Step 810). If the user want to confirm the information recorded on the optical disk 1 immediately after the recording of all the information signals Sin has been finished, the user inputs the indication of specifying the reproducing process. If so, the process proceeds to the step 2 in FIG. 3.

On the other hand, if the indication of specifying the reproducing process is not input, the CPU 17 executes a step 811. At the step 811, the CPU 17 compares the final record addresses F1, F2 stored in the internal RAM with the final address E1, E2 in the lead-in area and the lead-out area, respectively. Accordingly, similarly to the step 805, the CPU 17 determines whether or not the non-recorded area of the sub information signal is present in the lead-in area or the leadout area. Then, if the non-recorded area is present in the lead-in area, or if the non-recorded area is present in the lead-out area, the CPU 17 executes the processes at steps 812 to 814. The processes at the steps 812 to 814 are identical to the processes at the steps 806 to 808.

In addition, the reason why the processes at the steps 811 to 814 are executed in spite of the executions of the processes at the steps 805 to 808 is described as follows. That is, the recording operation of the sub information signal Scd on the lead-in area and the lead-out area is usually completed by executing the processes at the steps 805 to 808 during recording the information signal Sin on the optical disk 1. However, for example, if the information signal Sin to be recorded on the optical disk 1 is small, there may be a case that the recording operation of the sub information signal Scd is not completed during recording the information signal Sin. In this case, the sub information signal Scd is recorded at the steps 812 to 814.

If the sub information signal Scd is completely recorded on the lead-in area and the lead-out area and thereby the non-recorded area is not present, the CPU 17 determines "NO" at the step 811. Then, the recording process is ended.

Figure 5:
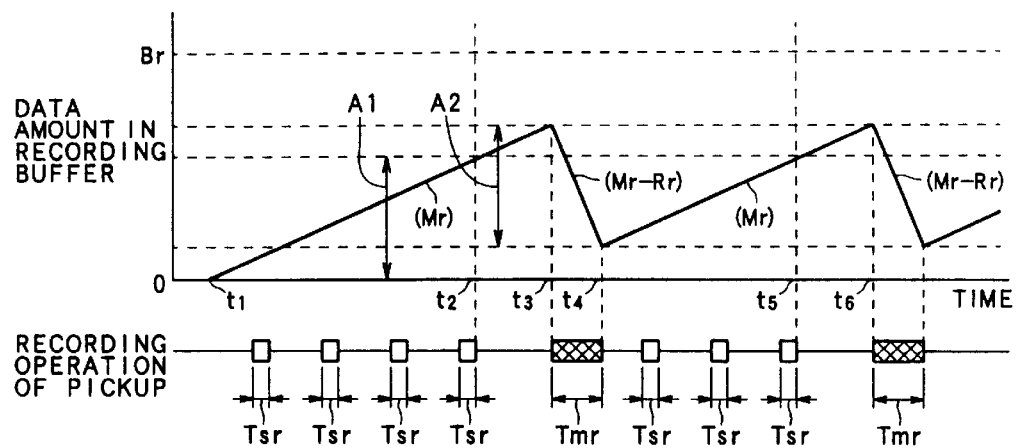
FIG. 5 is a view showing a data amount accumulated in a recording buffer of the information recording apparatus and the situation of the recording operation.

The change of the data amount within the recording buffer 6 in the above-mentioned recording process (FIGS. 4A and 4B) will be described with reference to FIG. 5. The upper portion of FIG. 5 shows the change in the data amount of the compression information signal Spd accumulated in the recording buffer 6. The lower portion of FIG. 5 shows a period Tmr while the record signal Sr corresponding to the information signal Sin is recorded on the optical disk 1 and a period Tsr while the sub information signal Scd is recorded on the optical disk 1. The record signal Sr having the second predetermined amount As is recorded on the main record area of the optical disk 1 within the period Tmr. The sub information signal Scd of the one unit block is recorded on the lead-in area and the lead-out area of the optical disk 1 within the period Tsr.

In FIG. 5, the recording process of the information signal Sin is started at a time t1. Accordingly, the compression information signal Spd corresponding to the information signal Sin is accumulated in the recording buffer 6 at the input rate Mr. This results in the gradual increase of the data amount of the compression information signal Spd accumulated in the recording buffer 6.

The recording operation of the sub information signal Scd is executed until the data amount of the compression information signal Spd accumulated in the recording buffer 6 reaches the first predetermined amount A1. For example, in FIG. 5, the recording operation of the sub information signal Scd is executed four times (four blocks) until the data amount of the compression information signal Spd accumulated in the recording buffer 6 reaches the first predetermined amount A1.

The data amount of the compression information signal Spd accumulated in the recording buffer 6 reaches the first predetermined amount A1 at a time t2. The searching operation of the record position of the record information Sr corresponding to the compression information signal Spd is executed between the time t2 and a time t3. Then, the recording operation of the record signal Sr corresponding to the compression information signal Spd is executed at the time t3.

The recording operation of the record information Sr having the second predetermined amount A2 is ended at a time t4. In succession, the recording operation of the sub information signal Scd is executed between the time t4 and a time t5. Then, if the compression information signal Spd within the recording buffer 6 again reaches the first predetermined amount A1 at the time t5, the recording operation of the record signal Sr corresponding to the compression information signal Spd is again executed (Time t6).

The above-mentioned operations are repeated in the recording process.

In FIG. 5, the data amount of the compression information signal Spd within the recording buffer 6 is increased at the input rate Mr between the time t1 and the time t3 (or between the time t4 and the time t6). On the other hand, the data amount of the compression information signal Spd within the recording buffer 6 is decreased at a rate R between the time t3 and the time t4. The rate R is represented as follows:

$$R=Mr-Rr \qquad (1)$$

As can be understood from the above description, according to the information recording apparatus 100 of the embodiment in the present invention, the sub information signal Scd can be recorded while continuing to input the information signal Sin. That is, it is possible to substantially simultaneously record the record signal Sr corresponding to the information signal Sin and record the sub information signal Scd. Especially, the sub information signal Scd is recorded by using the period while the recording operation of the record signal Sr corresponding to the information signal Sin is not executed. Hence, the sub information signal Scd can be effectively recorded, which enables the entire time necessary for the recording process to be shortened.

The reproducing process of the information recording apparatus 100 will be described actually with reference to FIGS. 6A and 6B.

Figure 6A:
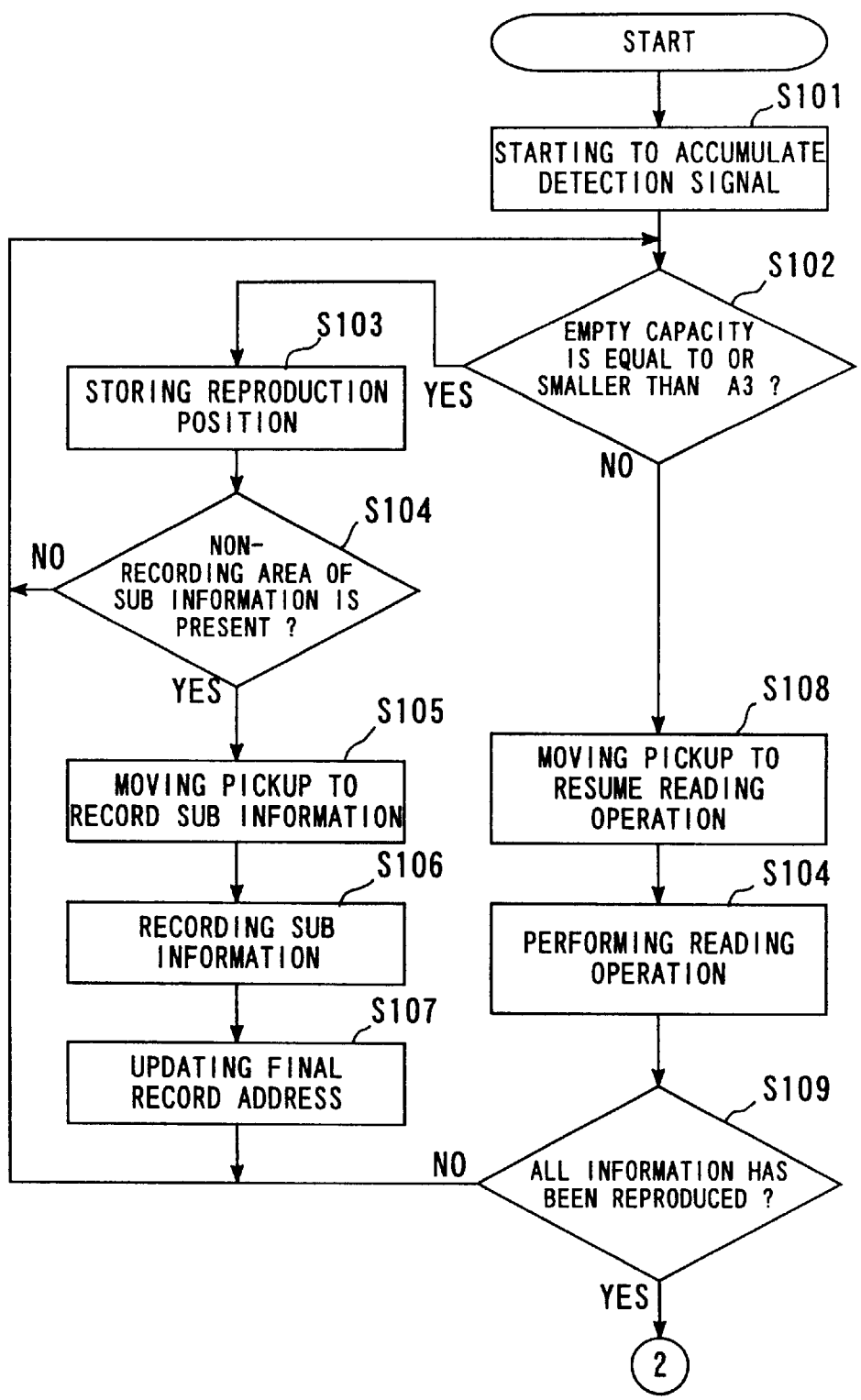
FIG. 6A is a flowchart showing a reproducing process according to the embodiment in the present invention.
Figure 6B:
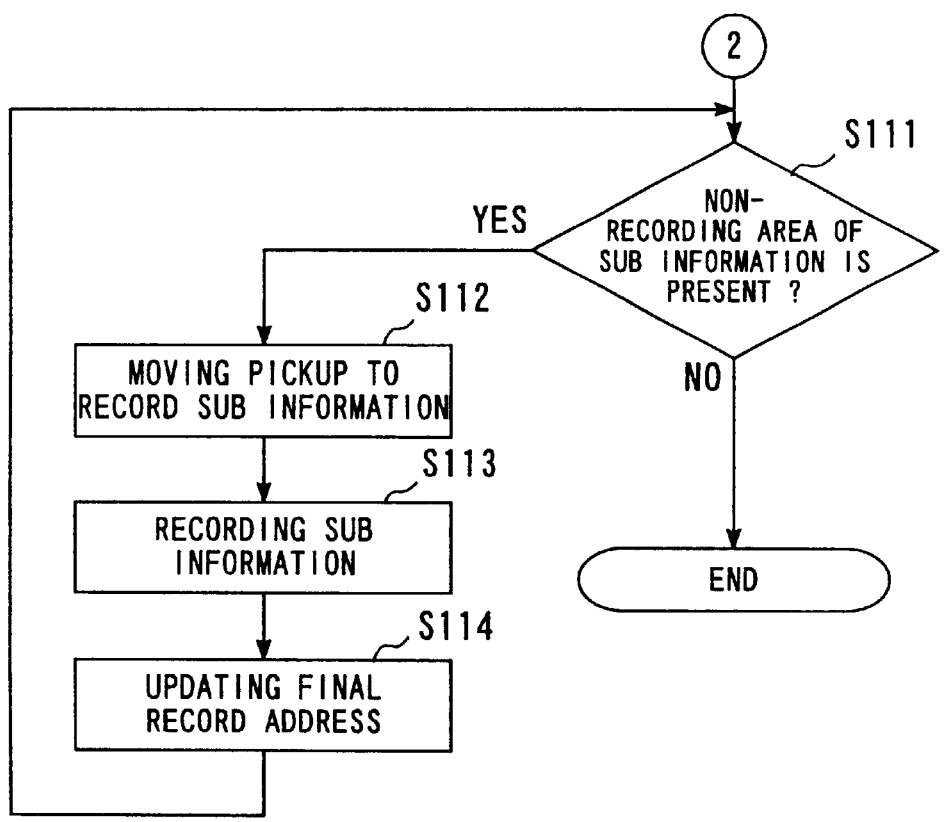
FIG. 6B is a flowchart showing a reproducing process according to the embodiment in the present invention.

If the indication signal Sc indicative of the reproducing process is input to the information recording apparatus 100, the CPU 17 executes the reproducing process shown in FIGS. 6A and 6B. As shown in FIG. 6A, the CPU 17 firstly instructs the pickup 2 to move, and then controls the pickup 2 such that the light beam B for the reproduction is radiated to the reproduction position on the optical disk 1. Accordingly, the detection signal Sp is generated at the detection rate Rp. This detection signal Sp is converted into the decoding signal Sdd through the reproduction circuit 10 and the decoder 11 under the control of the CPU 17, and accumulated in the reproduction buffer 12 (Step 101). Then, the decoding signal Sdd accumulated in the reproduction buffer 12 is read out at the output rate Mp under the control of the CPU 17, and converted into the output signal Sout by the restoring circuit 13 and the D/A converter 14, and finally output.

In such a process, the decoding signal Sdd is accumulated in the reproduction buffer 12 at a speed corresponding to the difference between the detection rate Rp and the output rate Mp. The CPU 17 determines whether or not the empty capacity of the reproduction buffer 12 becomes equal to or smaller than a third predetermined amount A3, based on the data amount signal Smp sent by the reproduction buffer 12 (Step 102). The third predetermined amount A3 is defined in advance, and it is defined by considering a capacity Bp of the reproduction buffer 12 and the like. For example, the third predetermined amount A3 is equal to the data amount corresponding to the one ECC block of the decoding signal Sdd.

If the empty capacity of the reproduction buffer 12 becomes equal to or smaller than the third predetermined amount A3, the reading operation (the detecting operation) of the pickup 2 is suspended. Then, the reproduction position on the optical disk 1 at the suspended time is stored in the internal RAM of the CPU 17 (Step 103).

Next, the CPU 17 compares the final record addresses F1, F2 stored in the internal RAM with the final addresses E1, E2 in the lead-in area and the lead-out area, respectively (Step 104). Accordingly, the CPU 17 determines whether or not the non-recorded area is present in the lead-in area or the lead-out area.

If the non-recorded area of the sub information signal Scd is not present in the lead-in area or the lead-out area, the final record addresses F1, F2 agree with the final address E1, E2, respectively. In this case, the process returns back to the step 102. Then, the CPU 17 continues to suspend the recording operation (the detecting operation) of the pickup 2 until the empty capacity of the reproduction buffer 12 exceeds the third predetermined amount A3.

On the other hand, if the non-recorded area is present in the lead-in area at the step 104, the final record address F1 is smaller than the final address E1 in the lead-in area. In this case, the CPU 17 instructs the pickup 2 to move to the next address after the final record address F1. On the other hand, if the non-recorded area is present in the lead-out area, the final record address F2 is smaller than the final address E2 in the lead-out area. In this case, the CPU 17 instructs the pickup 2 to move to the next address after the final record address F2 (Step 105).

Next, the CPU 17 controls the encoder 8, the recording circuit 9 and the pickup 2 so as to record on the optical disk 1 the sub information signal Scd stored in the memory 7 (Step 106). Accordingly, the sub information signal Scd is recorded from the next address after the final record address F1 or F2.

The record position of the end portion of the sub information signal recorded on the optical disk 1, namely, the final record address F1 or F2 is changed as the result that the sub information signal Scd is recorded on the optical disk 1 at the step 106. Thus, the CPU 17 updates the final record address F1 or F2 stored in the internal RAM (Step 107).

The sub information signal Scd is recorded on the lead-in area and the lead-out area in the processes at the steps 105 to 107. That is, the lead-in area and the lead-out area are formed until the empty capacity of the reproduction buffer 12 exceeds the third determined amount A3. In this way, the sub information signal Scd can be recorded by using the period while the recording operation of the pickup 2 is suspended by the difference between the detection rate Rp and the output rate Mp. Thus, the sub information signal Scd can be effectively recorded.

In addition, if the optical disk 1 on which the information was already recorded is reproduced, it may be usually considered that the sub information signal Scd is completely recorded on the lead-in area and the lead-out area. In this case, the CPU 17 determines "NO" at the step 104. Thus, the processes at the steps 105 to 107 are not executed. However, if the indication of specifying the reproducing process is input immediately after the execution of the recording process at the step 810 in FIG. 4B (Step 810; YES), there may be a case that the reproducing process of the optical disk 1 is executed in a condition that the sub information signal Scd has not been completely recorded on the lead-in area or the lead-out area. In this case, the processes at the steps 105 to 107 (or the steps 112 to 114) in FIGS. 6A and 6B may be executed.

On the other hand, if the empty capacity of the reproduction buffer 12 is greater than the third predetermined amount A3 at the step 102, the CPU 17 instructs the pickup 2 to move in order to resume the reading operation of the pickup 2 from the reproduction position, which has been stored in the internal RAM at the step 103 (Step 108). Then, the CPU 17 controls the pickup 2 so as to resume the generation of the detection signal Sp (Step 109).

Next, the CPU 17 determines whether or not all the information to be reproduced are reproduced (Step 110). If all the information to be reproduced are reproduced, the CPU 17 executes a step 111 in FIG. 6B. At the step 111, the CPU 17 compares the final record addresses F1, F2 stored in the internal RAM with the final addresses E1, E2 in the lead-in area and the lead-out area, respectively. Accordingly, similarly to the step 104, the CPU 17 determines whether or not the non-recorded area is present in the lead-in area or the lead-out area. Then, if the non-recorded area is present in the lead-in area, or if the non-recorded area is present in the lead-out area, the CPU 17 executes the processes at the steps 112 to 114. The processes at the steps 112 to 114 are identical to the processes at the steps 105 to 107.

On the other hand, if the non-recorded area is not present in the lead-in area or the lead-out area at the step 111, the reproducing process is ended.

Figure 7:
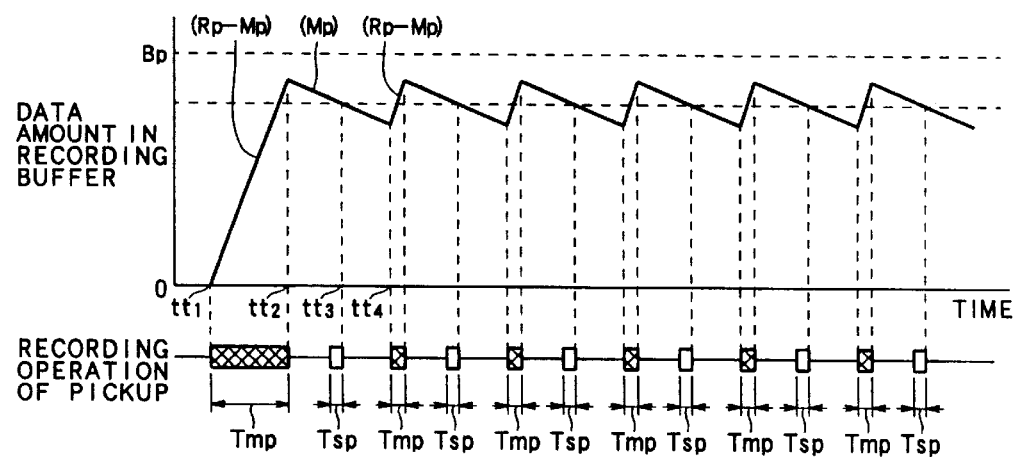
FIG. 7 is a view showing an empty capacity of a reproduction buffer in the information recording apparatus and the recording operation of a pickup.

The change of the empty capacity within the reproduction buffer 12 in the above-mentioned reproducing process (FIGS. 6A and 6B) will be described with reference to FIG. 7. The upper portion of FIG. 7 shows the change in the empty capacity of the reproduction buffer 12. The lower portion of FIG. 7 shows a period Tmp while the pickup 2 executes the reading operation (detecting operation) and the period Tsr while the sub information signal Scd is recorded on the optical disk 1.

In FIG. 7, the reading operation of the pickup 2 is started at a time tt1. Accordingly, the detection signal Sp is generated. Then, this is converted into the decoding signal Sdd and accumulated in the reproduction buffer 12. The accumulation of the decoding signal Sdd in the reproduction buffer 12 causes the empty capacity of the reproduction buffer 12 to be decreased at a rate P. The rate P is represented as follows:

$$P = Rp - Mp \qquad (2)$$

The empty capacity of the reproduction buffer 12 becomes equal to or smaller than the third predetermined amount A3 at a time tt2. The reading operation of the pickup 2 is suspended at the time tt2. As a result, the empty capacity of the reproduction buffer 12 is increased at the output rate Mp.

After the time tt2, the sub information signal Scd is stored in the lead-in area or the lead-out area. Then, the empty capacity of the reproduction buffer 12 exceeds the third predetermined amount A3 at a time tt3. The recording operation of the sub information signal Scd is suspended at this time.

The searching operation of searching the reproduction position at the time tt2 is executed between the time tt3 and a time tt4. Then, the reading operation of the pickup 2 is resumed at the time tt4. As a result, the empty capacity of the reproduction buffer 12 is again decreased at the rate P. After that, such operations are repeated.

As can be understood from the above description, according to the information recording apparatus 100 of the embodiment in the present invention, the sub information signal Scd can be recorded while continuing to output the output signal Sout corresponding to the decoding signal Sdd accumulated in the reproduction buffer 12. That is, it is possible to substantially simultaneously reproduce the optical disk 1 and record the sub information signal Scd.

In addition, in this embodiment, the lead-out area is the predefined fixed area (for example, from a diameter of 116 mm to a diameter of 117 mm) as shown in FIG. 7. However, the present invention can be applied to even a case in which a start position of the lead-out area can be changed in accordance with an amount of information to be recorded on the optical disk. In this case, the start position of the lead-out area is set in accordance with the amount of the information to be recorded on the optical disk. Moreover, if information is added to the optical disk where information was already recorded and the lead-out area was already formed, the additional information may be overwritten from a start position of the already-formed lead-out area and then a start position of a new lead-out area may be set in accordance with the amount of the additional information.

Also, if the amount of the information to be recorded on the main record area is smaller than the amount of the information which can be recorded on the predefined main record area (for example, from a diameter of 48 mm to a diameter of 116 mm), a non-recorded part is generated in the main record area at a stage when the recording operation of the information is ended. It is necessary to record a sub information signal on this non-recorded part. If the present invention is applied, the sub information signal can be effectively recorded on the non-recorded part as described below.

That is, in the recording process, after the sub information signal Scd is completely recorded on the predefined lead-out area, the sub information signal is recorded from the innermost circumference position P1 (FIG. 7) in the lead-out area to the inner circumference direction of the optical disk. The recording operation of this sub information signal is executed substantially concurrently with the recording operation of the information signal Sin on the main record area, by using the manner similar to the recording process shown in FIG. 4A. Accordingly, the sub information signal can be effectively recorded on the non-recorded part. Hence, the recording process of the optical disk can be entirely shorten.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-76609 filed on Mar. 9, 1998 including the specification, claims, drawings and summary is incorporated herein by reference in its entirety.

What is claimed is:

1. An apparatus for recording main information and sub information onto an information recording medium, which has a main recording area and a sub recording area, the main information being input from an external source, the apparatus comprising:

- a receiving device that receives the main information input from the external source;
- an accumulating device that accumulates the main information received from the external source;
- a recording device that records the main information and the sub information to the main recording area and the sub recording area, respectively; and
- a controller that during the main information recording process detects at least one period when main information is not being recorded or reproduced, the period occurring before the completion of the main information recording process,
- wherein the recording device records the sub information to the sub recording area under a control of the controller when the at least one period is detected.

2. The apparatus according to claim 1, wherein
   the controller further determines whether or not a non-recorded area is present in the sub recording area; and
   the recording device records the sub information to the sub recording area under a control of the controller when the period is detected and the non-recorded area is present.

3. The apparatus according to claim 2, the apparatus further comprising a memory device,
   wherein the controller further detects a record position at the end portion of the sub information recorded on the sub recording area, stores the detected record position in the memory device as final record address, and instructs the recording device moves to the next address after the final record address when the period is detected.

4. The apparatus according to claim 3, wherein
   the controller updates the final record address stored in the memory device after the sub information is recorded on the sub recording area.

5. The apparatus according to claim 1, wherein the sub recording area is a lead in area or a lead out area.

6. A method for recording main information and sub information onto an information recording medium, which has a main recording area and a sub recording area, the main information being input from an external source, the method comprising:

- receiving the main information input from the external source;
- accumulating the main information received from the external source;
- recording the main information and sub information to the main recording area and the sub recording area, respectively; and
- detecting during the main information recording process at least one period when main information is not being recorded or reproduced, the period occurring before the completion of the main information recording process,
- wherein the sub information is recorded to the sub recording area when the at least one period is detected.

7. The method according to claim 6, further comprising:
   determining whether or not a non-recorded area is present in the sub recording area,
   wherein the sub information is recorded to the sub recording area when the at least one period is detected and the non-recorded area is present.

8. The method according to claim 6, further comprising:
   detecting a record position at the end portion of the sub information recorded on the sub recording area, and
   storing the record position as a final record address,
   wherein the sub information is recorded beginning at the next address following the final address in the sub recording area, when the at least one period is detected.

9. The method according to claim 8, further comprising:
   updating the final record address after the sub information is recorded on the sub recording area.

10. The method according to claim 6, wherein the sub recording area is a lead in area or a lead out area.

* * * * *